(12) United States Patent
Fukuoka et al.

(10) Patent No.: US 12,030,243 B2
(45) Date of Patent: Jul. 9, 2024

(54) MEASURING APPARATUS, MOVABLE APPARATUS, ROBOT, ELECTRONIC DEVICE, FABRICATING APPARATUS, AND MEASURING METHOD

(71) Applicant: Ricoh Company, Ltd., Tokyo (JP)

(72) Inventors: Naoki Fukuoka, Osaka (JP); Yoshihiko Miki, Kyoto (JP); Kazuhiro Yoneda, Osaka (JP)

(73) Assignee: RICOH COMPANY, LTD., Tokyo (JP)

( * ) Notice: Subject to any disclaimer, the term of this patent is extended or adjusted under 35 U.S.C. 154(b) by 238 days.

(21) Appl. No.: 17/202,749

(22) Filed: Mar. 16, 2021

(65) Prior Publication Data

US 2021/0291435 A1     Sep. 23, 2021

(30) Foreign Application Priority Data

Mar. 19, 2020 (JP) ................................. 2020-050203
Jan. 21, 2021 (JP) ................................. 2021-008329

(51) Int. Cl.
*B29C 64/129* (2017.01)
*B25J 19/02* (2006.01)
(Continued)

(52) U.S. Cl.
CPC ............. *B29C 64/129* (2017.08); *B25J 19/02* (2013.01); *B29C 64/209* (2017.08);
(Continued)

(58) Field of Classification Search
CPC ... B29C 64/129; B29C 64/209; B29C 64/227; B29C 64/268; B29C 64/286;
(Continued)

(56) References Cited

U.S. PATENT DOCUMENTS 6,039,254 A * 3/2000 Froese-Peeck .... G06K 7/10732
                                                235/462.32
6,674,917 B1 * 1/2004 Hisaki .................. G06T 15/506
                                                382/284
(Continued)

FOREIGN PATENT DOCUMENTS

CN     101013093 A     8/2007
CN     103620341 A     3/2014
(Continued)

OTHER PUBLICATIONS

Office Action issued Jan. 31, 2023 in Chinese Patent Application No. 202110268883.4, 8 pages.

*Primary Examiner* — Kathleen Y Dulaney (74) *Attorney, Agent, or Firm* — XSENSUS LLP (57) ABSTRACT

A measuring apparatus includes an irradiation device configured to irradiate an object with light; an imaging device configured to capture an image of the object irradiated with the light and generate captured image data; and circuitry. The circuitry is configured to measure the object based on the captured image data generated by the imaging device; and adjust, with a moving mechanism, relative positions among the object, the irradiation device, and the imaging device in response to a determination that the captured image data includes a region satisfying a predetermined condition.

22 Claims, 7 Drawing Sheets

(51) Int. Cl.
  *B29C 64/209* (2017.01)
  *B29C 64/227* (2017.01)
  *B29C 64/268* (2017.01)
  *B29C 64/286* (2017.01)
  *B29C 64/393* (2017.01)
  *B33Y 10/00* (2015.01)
  *B33Y 30/00* (2015.01)
  *B33Y 50/02* (2015.01)
  *G01B 11/25* (2006.01)

(52) U.S. Cl.
  CPC .......... *B29C 64/227* (2017.08); *B29C 64/268* (2017.08); *B29C 64/286* (2017.08); *B29C 64/393* (2017.08); *B33Y 10/00* (2014.12); *B33Y 30/00* (2014.12); *B33Y 50/02* (2014.12); *G01B 11/25* (2013.01)

(58) Field of Classification Search
  CPC ... B29C 64/393; B29C 64/106; B29C 64/386; B25J 19/02; B33Y 10/00; B33Y 30/00; B33Y 50/02; B33Y 50/00; G01B 11/25; B22F 10/20; B22F 12/90; Y02P 10/25
  USPC ................ 382/153, 275, 284, 167; 356/364; 348/345; 396/155
  See application file for complete search history.

(56) References Cited

U.S. PATENT DOCUMENTS

| | | | | |
|---|---|---|---|---|
| 6,718,051 B1* | 4/2004 | Eschbach | ................. | G06T 7/11 382/117 |
| 7,684,614 B2* | 3/2010 | Kim | ................. | G06T 7/586 382/154 |
| 7,760,962 B2* | 7/2010 | Sambongi | ................. | G06T 5/50 382/153 |
| 7,783,186 B2* | 8/2010 | Ishiwata | ................. | H04N 23/611 382/118 |
| 7,929,151 B2* | 4/2011 | Liang | ................. | A61B 1/0625 382/128 |
| 7,936,944 B2* | 5/2011 | Sato | ................. | G06V 10/145 382/173 |
| 8,184,194 B2* | 5/2012 | Sato | ................. | G02B 27/288 353/121 |
| 9,002,094 B2* | 4/2015 | Hirota | ................. | G06T 7/0002 382/141 |
| 9,911,395 B1* | 3/2018 | Townsend | ............ | G09G 3/3406 |
| 9,912,847 B1* | 3/2018 | Yuan | ................. | H04N 23/00 |
| 10,733,469 B2* | 8/2020 | Mayer | ................. | H04N 23/635 |
| 11,636,779 B2* | 4/2023 | Zhang | ................. | G06F 30/20 434/365 |
| 2004/0130731 A1* | 7/2004 | Yamaguchi | ............ | G01B 11/25 356/610 |
| 2005/0276508 A1* | 12/2005 | Coleman | ................. | G06V 10/30 382/275 |
| 2007/0183646 A1* | 8/2007 | Beaty | ................. | G06T 7/0004 382/145 |
| 2007/0285672 A1* | 12/2007 | Mukai | ................. | G01B 11/2518 356/606 |
| 2009/0129801 A1* | 5/2009 | Donaldson | ........ | G03G 15/5037 399/49 |
| 2009/0208108 A1* | 8/2009 | Shimano | ................. | G06T 5/94 382/218 |
| 2009/0226049 A1* | 9/2009 | Debevec | ................. | G06T 15/50 382/118 |
| 2009/0279807 A1* | 11/2009 | Kanamori | ............ | G02B 5/3025 348/222.1 |
| 2010/0002244 A1* | 1/2010 | Iino | ................. | G01M 17/027 73/146 |
| 2010/0131235 A1* | 5/2010 | Aoba | ................. | G06T 7/70 356/615 |
| 2010/0135534 A1* | 6/2010 | Weston | ................. | G06T 7/593 382/106 |
| 2012/0098961 A1* | 4/2012 | Handa | ................. | G01B 11/2518 356/601 |
| 2012/0155724 A1* | 6/2012 | Kitamura | ................. | G06T 7/12 382/128 |
| 2012/0294509 A1* | 11/2012 | Matsumoto | ............ | B25J 9/1697 382/153 |
| 2013/0251288 A1* | 9/2013 | Kobiki | ................. | G06T 5/73 382/298 |
| 2013/0329073 A1* | 12/2013 | Majewicz | ............ | G06V 10/141 348/222.1 |
| 2014/0016021 A1* | 1/2014 | Uchida | ................. | H04N 25/134 348/353 |
| 2014/0104621 A1* | 4/2014 | Ichimaru | ............ | G01B 11/2518 356/602 |
| 2014/0217904 A1* | 8/2014 | Lee | ................. | H05B 47/10 315/153 |
| 2015/0178545 A1* | 6/2015 | Thorsted | ............ | G06V 40/1335 382/124 |
| 2015/0235375 A1* | 8/2015 | Imagawa | ................. | G06T 5/50 382/164 |
| 2017/0244876 A1* | 8/2017 | Ida | ................. | H04N 23/56 |
| 2017/0359560 A1* | 12/2017 | Winn | ................. | H04N 1/00183 |
| 2019/0043180 A1* | 2/2019 | Mayer | ................. | G06T 5/50 |
| 2019/0147213 A1* | 5/2019 | Yeke Yazdandoost | ................. | G06V 40/1318 382/124 |
| 2019/0191078 A1* | 6/2019 | Nanaumi | ................. | H04N 23/632 |
| 2020/0004127 A1 | 1/2020 | Yoneda et al. | | |
| 2020/0064480 A1 | 2/2020 | Fukuoka et al. | | |
| 2020/0166768 A1 | 5/2020 | Yoneda et al. | | |
| 2021/0112647 A1* | 4/2021 | Coleman | ................. | H05B 47/16 |

FOREIGN PATENT DOCUMENTS

| | | |
|---|---|---|
| CN | 107091617 A | 8/2017 |
| JP | 2005-172622 A | 6/2005 |
| JP | 2015-010845 | 1/2015 |
| JP | 2018-096872 A | 6/2018 |
| JP | 2020-009749 | 1/2020 |

* cited by examiner

MEASURING APPARATUS, MOVABLE APPARATUS, ROBOT, ELECTRONIC DEVICE, FABRICATING APPARATUS, AND MEASURING METHOD

CROSS-REFERENCE TO RELATED APPLICATIONS

This patent application is based on and claims priority pursuant to 35 U.S.C. § 119(a) to Japanese Patent Application Nos. 2020-050203, filed on Mar. 19, 2020, and 2021-008329, filed on Jan. 21, 2021, in the Japan Patent Office, the entire disclosure of each of which is hereby incorporated by reference herein.

BACKGROUND

Technical Field

The present disclosure relates to a measuring apparatus, a method for measuring an object, a movable apparatus, a robot, an electronic device, and a fabricating apparatus.

Related Art

Currently, for example, in the field of factory automation (FA) in various types of assembly lines in factories, active stereo measuring apparatuses capable of contactless measurement are used for inspection or recognition of parts.

One type of contactless measuring apparatuses is apparatuses employing laser probe sensing or line laser sensing. Additionally, in recent years, so-called projector-camera measurement capable of measurement in an area (plane) receives attention.

A three-dimensional measuring apparatus based on a projector-camera system captures, with a camera (imaging device), an object on which a pattern image for measurement (measurement pattern) is projected from a projector, thereby acquiring data of corresponding points (e.g., coordinates) from the captured image. Then, the three-dimensional measuring apparatus restores a three-dimensional shape of the object to be measured from the acquired data of the corresponding points and measures the three-dimensional shape.

SUMMARY

According to an embodiment of this disclosure, a measuring apparatus includes an irradiation device configured to irradiate an object with light; an imaging device configured to capture an image of the object irradiated with the light and generate captured image data; and circuitry. The circuitry is configured to measure the object based on the captured image data generated by the imaging device; and adjust, with a moving mechanism, relative positions among the object, the irradiation device, and the imaging device in response to a determination that the captured image data includes a region satisfying a predetermined condition.

According to another embodiment, a measuring apparatus includes the irradiation device and the imaging device described above. The measuring apparatus further includes circuitry configured to measure the object based on the captured image data generated by the imaging device; in response to a determination that the captured image data includes a region satisfying a predetermined condition, calculate relative positions among the object, the irradiation device, and the imaging device. The calculated relative positions are for capturing an image of the object for generating data for supplementing the region. The circuitry is further configured to display, on a display, the calculated relative positions.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Referring to the drawings, embodiments of the present disclosure are described below. As used herein, the singular forms "a," "an," and "the" are intended to include the plural forms as well, unless the context clearly indicates otherwise.

A description is given below of a three-dimensional measuring apparatus according to the present disclosure.

As an example, the measuring apparatus according to the present embodiment is used for three-dimensional measurement of an object using a pattern projection method.

A measurement pattern projected on the object may be specularly reflected by the object and incident on an image sensor (camera) depending on the relative positions between the three-dimensional measuring apparatus and the object during the measurement. That is, strong light is partially incident on the image sensor (camera), and the captured image includes a pixel region in which brightness value is saturated (partial saturation occurs in the image).

By contrast, in a case where the object easily absorbs light because of the color or the material, the measurement pattern may be absorbed by the object depending on the relative positions between the three-dimensional measuring apparatus and the object during the measurement. Then, the amount of light incident on the image sensor (camera) is insufficient, that is, brightness contrast (hereinafter "contrast") is low. As a result, the captured image includes a pixel region in which contrast is insufficient (the image includes a portion that is partially dark).

In view of the foregoing, the measuring apparatus according to embodiments of the present disclosure is configured to: recognize an invalid region due to saturation or a decrease in contrast in the measurement result of the three-dimensional measuring apparatus; estimate, from a measurement result of a valid measurement region around the invalid region, a portion of the object corresponding to the invalid region, the projection angle of the measurement pattern, and the angle of incidence of the reflected light on the image sensor; and calculate, based on the estimated measurement result, relative positions (position and posture or angle) between the three-dimensional measuring apparatus and the object with which saturation or a decrease in contrast is not caused in the invalid region. Then, control the three-dimensional measuring apparatus to perform capturing with the calculated relative positions, to acquire a captured image without saturation or a decrease in contrast, and interpolate, with the captured image, the invalid region of the previously captured image. As a result, the three-dimensional measuring apparatus can measure the object accurately and reliably.

A first embodiment is described below.

Figure 1:
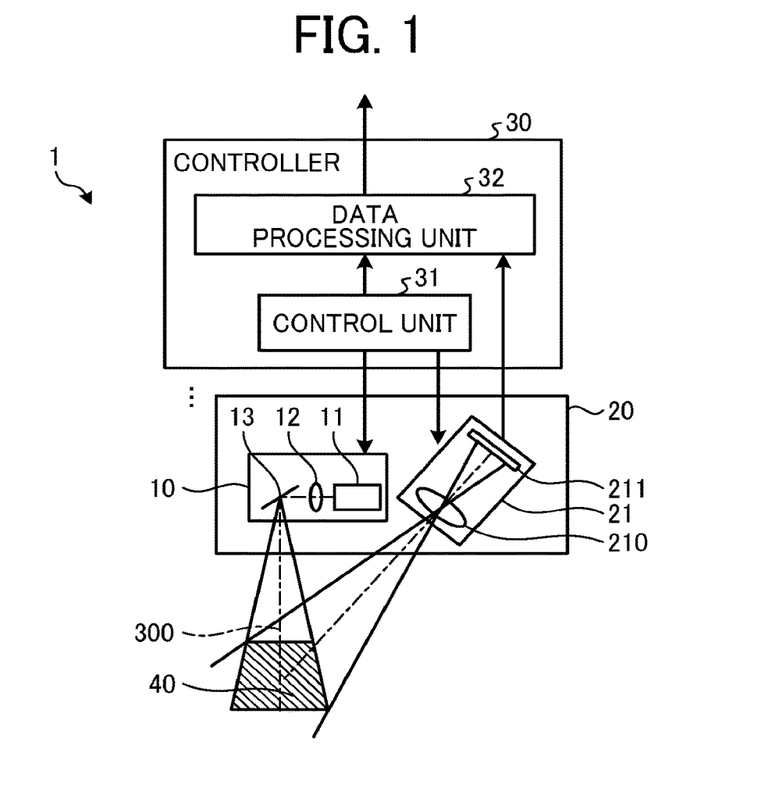
FIG. 1 is a block diagram illustrating a three-dimensional measuring apparatus according to a first embodiment of the present disclosure.
Figure 2:
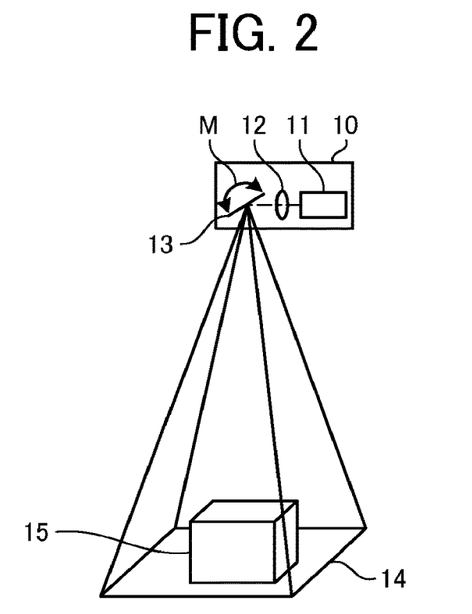
FIG. 2 is a diagram illustrating a state in which the three-dimensional measuring apparatus illustrated in FIG. 1 projects a measurement pattern on an object.

The first embodiment provides a three-dimensional measuring apparatus that measures the three-dimensional shape of an object using a pattern projection method. FIG. 1 is a block diagram illustrating a three-dimensional measuring apparatus 1 according to the first embodiment. FIG. 2 is a diagram illustrating a state in which the three-dimensional measuring apparatus 1 according to the first embodiment projects a measurement pattern (light of predetermined pattern) onto an object.

As illustrated in FIG. 1, the three-dimensional measuring apparatus 1 according to the first embodiment includes a measurement information acquisition unit 20 and a controller 30.

As illustrated in FIGS. 1 and 2, the measurement information acquisition unit 20 includes a projector 10 and a camera 21. The projector 10 illustrated in FIG. 1 is an example of a projection device, and includes a vertical cavity surface emitting laser (VCSEL) array 11, an optical system 12, and an optical deflection element 13. The VCSEL array 11 includes, as a light source, a plurality of VCSEL elements arranged one-dimensionally or two-dimensionally. The VCSEL array 11 is an example of an irradiation device.

The measurement information acquisition unit 20 deflects the light of the plurality of light-emitting elements of the VCSEL array 11 by the optical deflection element 13 and projects the deflected light onto the object 15 in a measurement region, under the control of the control unit 31 of the controller 30. The hardware configuration of the controller 30 is the same as that of a general-purpose computer or a personal computer (PC), and includes a central processing unit (CPU), a read only memory (ROM), a random access memory (RAM), a communication circuit, and the like. The control unit 31 controls the brightness and lighting timing of each light-emitting element of the VCSEL array 11, thereby projecting projection light 14 of a predetermined measurement pattern onto the measurement region including the object 15 as illustrated in FIG. 2.

For example, the measurement pattern can be generated as follows. As the control unit 31 controls turning on and off of the light-emitting elements of the VCSEL array 11, the projector 10 projects a predetermined projection pattern such as a black and white gray code pattern. In FIG. 1, the optical system 12 to form the light of the VCSEL array 11 (the light source) into a line shape is separate from the light source, but the VCSEL array 11 and the optical system 12 may be included in a light source unit. The light is not limited to visible light but includes infrared light, for example, near-infrared light having a wavelength of 0.7 to 2.5 μm.

The camera 21 as an example of the imaging device captures the above-mentioned measurement region in a state in which the position (and posture or angle) of the camera 21 is fixed such that a projection center 300 of the projection light 14 projected by the projector 10 onto the object 15 is at the center of an image capturing region.

The camera 21 includes a lens 210 and an image sensor 211. The image sensor 211 is, for example, an image sensor of a charge-coupled device (CCD) or a complementary metal oxide semiconductor (CMOS). The light incident on the camera 21 is imaged on the image sensor 211 via the lens 210 and photoelectrically converted into an electric signal (image signal). The image signal (captured image data) generated by the photoelectric conversion by the image sensor 211 is supplied to the data processing unit 32 of the controller 30.

A narrow band filter that transmits the emission wavelength of the VCSEL array 11 may be used for the lens 210. This configuration can reduce the influence of ambient light (disturbance light such as light of a fluorescent lamp) at the time of measurement, thereby enabling highly accurate measurement. A narrow band filter may be provided on the upstream side of the lens 210 in the direction of light. In this case as well, the same effect can be acquired. Furthermore, use of a laser light source whose oscillation wavelength is in the range of invisible light is advantageous in eliminating the influence of visible light due to ambient light, thereby enabling highly accurate measurement. In a case where the image captured under such conditions includes an invalid region, the laser beam emitted from the projector 10 can be determined as the cause of the invalid region.

The controller 30 controls projection of the measurement pattern light by the projector 10 and image capturing by the camera 21, and performs computation such as three-dimensional measurement of the object 15 based on an image signal which is data of the image captured by the camera 21. The control unit 31 may control the change of the measurement pattern light projected by the projector 10 into another pattern light. Further, the control unit 31 may control the output of calibration information used by the data processing unit 32 for calculating three-dimensional coordinates.

The data processing unit 32 (an example of a measurement unit) of the controller 30 calculates (measures) the three-dimensional coordinates corresponding to the three-dimensional shape of the object 15 or the information on the three-dimensional coordinates based on the supplied image signal. The data processing unit 32 may output the calculated three-dimensional shape data, indicating the three-dimensional shape, to an external device such as a personal computer (PC) under the control of the control unit 31.

The data processing unit 32 determines whether the input image signal includes a region (invalid region) that is difficult to be handled as a valid region or whether a region that is relatively difficult to be handled as valid region compared with other regions (a predetermined condition). When the image signal includes such an invalid region, based on the image signal and the three-dimensional shape of the object 15, the data processing unit 32 calculates position and posture information indicating position and posture of the measurement information acquisition unit 20 for the next image capturing, for acquiring supplementary data (supplementary image data) that supplements the invalid region.

The controller 30 controls a moving mechanism (for example, a robot arm 70 illustrated in FIG. 8) to change the position (and posture) of the measurement information acquisition unit 20 based on the calculated position and posture information so as to acquire the supplementary data that supplements the invalid region. As a result, the three-dimensional measuring apparatus 1 can capture a normal image without an invalid region in the next measurement.

The output value of the position and posture information may be an absolute value with respect to a predetermined reference origin of the three-dimensional measuring apparatus 1. Alternatively, the output value may be a relative value with respect to another coordinate of, such as the position and the posture of a hand of a robot to which the three-dimensional measuring apparatus 1 is attached at the time of measurement. When a relative value is used, the relative value can also be applied to visual feedback control or the like that uses only the relative values of the object 15 and the robot hand.

Although FIG. 1 illustrates an example in which the controller 30 corresponds to one measurement information acquisition unit 20, alternatively, the controller 30 may correspond to a plurality of measurement information acquisition units 20. Further, although the measurement information acquisition unit 20 is separate from the controller 30 in FIG. 1, a portion of the controller 30 or the entire controller 30 may be included in the measurement information acquisition unit 20.

Structure of Optical Deflection Element

The optical deflection element 13 is a mirror movable as indicated by arrow M in FIG. 2 and capable of scanning laser light in a single axial direction or a plurality of axial directions. As the movable mirror, for example, a micro-electro-mechanical systems (MEMS) mirror, a polygon mirror, and a galvano mirror are known. Any optical deflection element can be used as long as the laser light can be scanned in a single axial direction or a plurality of axial directions. Use of a MEMS mirror is preferable since the size and weight can be reduced.

For example, the movable mirror uniaxially scans the line-shaped light projected by the optical system 12 on the object 15, and generates two-dimensional projection pattern (planar pattern) by the optically scanning the line-shaped projection light.

Figure 3:
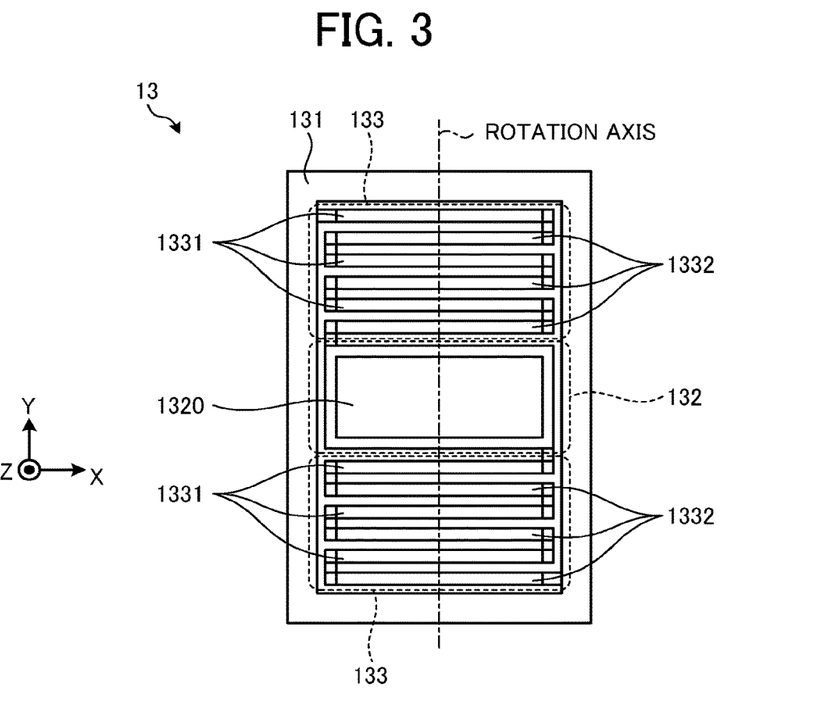
FIG. 3 is a diagram illustrating a configuration of a micro-electro-mechanical systems (MEMS) mirror which is an example of an optical deflection element.

FIG. 3 is a diagram illustrating an example of the configuration of the optical deflection element 13 that is a MEMS mirror. As illustrated in FIG. 3, the MEMS mirror as the optical deflection element 13 includes a movable portion 132 and two meandering beam sets 133 on the support 131.

The movable portion 132 includes a reflection mirror 1320. One end of each of meandering beam sets 133 is coupled to the movable portion 132, and the other end thereof is supported by the support 131. Each of the meandering beam sets 133 includes a plurality of beams in a meander shape. The plurality of beams includes first piezoelectric members 1331 deformed by application of a first voltage and second piezoelectric members 1332 deformed by application of a second voltage. The first piezoelectric member 1331 and the second piezoelectric member 1332 alternate with each other in the arrangement.

The first piezoelectric member 1331 is paired with the adjacent second piezoelectric member 1332, and the group of the first piezoelectric members 1331 is electrically independent from the group of the second piezoelectric members 1332. As voltages are applied, respectively, to the first piezoelectric member 1331 and the second piezoelectric member 1332, the two meandering beam sets 133 are deformed. This deformation rotates the reflection mirror 1320 of the movable portion 132 around the rotation axis.

Specifically, voltages having opposite phases are respectively applied to the first piezoelectric member 1331 and the second piezoelectric member 1332 to cause warpage in each beam. As a result, the adjacent beams warp in different directions, and such warpage are accumulated. Then, together with the movable portion 132 coupled to the two meandering beam sets 133, the reflection mirror 1320 reciprocates around the rotation axis. Further, a large rotation angle can be attained with a low voltage by application of a sine wave having a drive frequency matching the mirror resonance mode centered on the rotation axis to the first piezoelectric member 1331 and the second piezoelectric member 1332 in opposite phases.

The drive waveform may be a waveform other than the above-mentioned sine wave, or may be another waveform such as a sawtooth wave. Further, the drive may be performed, not limited to the resonance mode, but in a non-resonance mode. Further, the MEMS mirror can be driven in any driving method such as an electrostatic method, a piezoelectric method, or an electromagnetic method.

Functional Configuration of Controller

Figure 4:
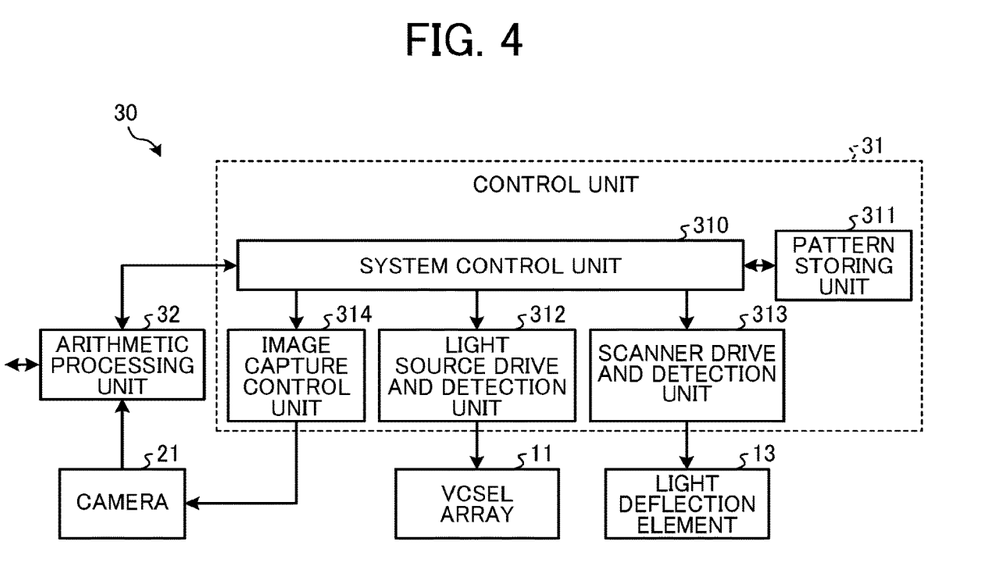
FIG. 4 is a diagram illustrating a functional configuration of a controller of a three-dimensional measuring apparatus illustrated in FIG. 1.

FIG. 4 is a block diagram illustrating a functional configuration of the controller 30 of the three-dimensional measuring apparatus 1. In FIG. 4, the data processing unit 32 analyzes the image signal supplied from the camera 21. The data processing unit 32 restores the three-dimensional information by the arithmetic processing using the analysis result of the image signal and the calibration information, thereby executing three-dimensional measurement of the object. The data processing unit 32 supplies the restored three-dimensional information to the control unit 31.

The control unit 31 includes a system control unit 310, a pattern storing unit 311, a light source drive and detection unit 312, a scanner drive and detection unit 313, and an image capture control unit 314.

The scanner drive and detection unit 313 drives the optical deflection element 13 under the control of the system control unit 310. The system control unit 310 controls the scanner drive and detection unit 313 so as to irradiate the object 15 with the light emitted from the optical deflection element 13. The image capture control unit 314 controls the image capture timing and the exposure amount of the camera 21 under the control of the system control unit 310.

The light source drive and detection unit 312 controls turning on and off of each light-emitting element of the VCSEL array 11 under the control of the system control unit 310. Further, the light source drive and detection unit 312 monitors the amount of light emitted from the VCSEL array 11, and performs feedback control to keep the amount of light constant even when the environment changes or the light source deteriorates.

The pattern storing unit 311 reads pattern information for generating the measurement pattern light stored, for example, in a non-volatile storage area of the three-dimensional measuring apparatus 1. The pattern storing unit 311 supplies the pattern information thus read to the system control unit 310 under the control of the system control unit 310. The system control unit 310 controls the light source drive and detection unit 312 based on the pattern information supplied from the pattern storing unit 311.

The system control unit 310 controls the pattern storing unit 311 to read the pattern information based on the restored three-dimensional information supplied from the data processing unit 32. The system control unit 310 controls the light source drive and detection unit 312 based on the pattern information read by the pattern storing unit 311.

Further, the system control unit 310 instructs the data processing unit 32 of the arithmetic method based on the read pattern information.

The data processing unit 32, the system control unit 310, and the image capture control unit 314 are implemented as the CPU executes a measurement program. Specifically, the CPU implements the data processing unit 32, the system control unit 310, and the image capture control unit 314 by reading and executing the measurement program from the ROM.

When the image based on the input image signal includes a region (invalid region) that is relatively difficult for the data processing unit 32 to handle as valid data or a region that is relatively difficult to handle as valid data compared with other regions, the data processing unit 32 calculates position and posture information indicating position and posture in next capturing of the measurement information acquisition unit 20 for acquiring supplementary data that supplements the invalid region. The data processing unit 32 calculates the position and the posture information based on the image signal and the three-dimensional shape of the object 15.

The controller 30, serving as a position controller, controls the position and posture of the measurement information acquisition unit 20, with the moving mechanism, based on the calculated position and posture information so that the supplementary data that supplements the invalid region can be acquired. As a result, the three-dimensional measuring apparatus 1 can capture a normal image without an invalid region in the next measurement.

Note that a part or all of the data processing unit 32, the system control unit 310, and the image capture control unit 314 may be implemented by hardware. Further, functional blocks other than the data processing unit 32, the system control unit 310, and the image capture control unit 314 may also be implemented by the measurement program.

Supplementation of Invalid Region

Figure 5:
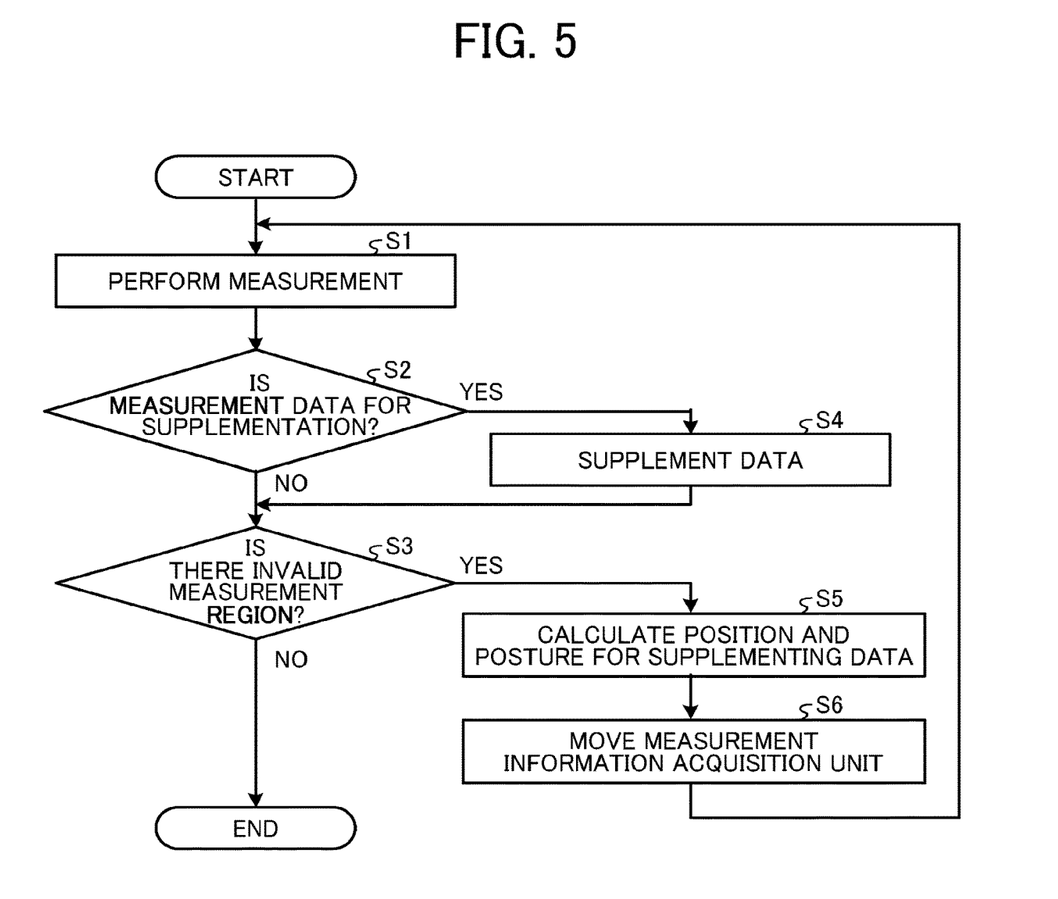
FIG. 5 is a flowchart illustrating an example of supplementation processing of an invalid region.

FIG. 5 is a flowchart illustrating supplementation processing of an invalid region performed by the system control unit 310. The system control unit 310 controls each process illustrated in the flowchart of FIG. 5 according to the measurement program.

In step S1, the system control unit 310 controls the measurement information acquisition unit 20 to capture an image of the object 15 to measure the shape of the object 15. The data processing unit 32 performs calculation based on the image signal as the measurement. In step S2, the system control unit 310 determines whether the measurement result acquired in step S1 for supplementation, that is, whether the measurement result acquired in step S1 is the result of first measurement of the object 15, or the result of subsequent measurement (second or later) performed for acquiring supplementary data. In response to a determination that the measurement result of the first measurement of the object 15 is acquired, the system control unit 310 proceeds to step S3. In response to a determination that the measurement result of the subsequent measurement for acquiring supplementary data is acquired, the system control unit 310 proceeds to step S4.

In step S4, the system control unit 310 supplements the invalid region of the image captured in the previous measurement with the supplementary data acquired from the image captured in the current measurement, and generates new shape measurement data. Then, the process proceeds to step S3.

On the other hand, in response to the determination in step S2 that the measurement result of the first measurement of the object 15 is acquired, in step S3, the system control unit 310 determines whether or not the captured image acquired in the first measurement includes an invalid region in which saturation has occurred or contrast has decreased based on the computation result by the data processing unit 32. In response to a determination that there is an invalid region, the system control unit 310 proceeds to step S5. In response to a determination that there is no invalid region, the system control unit 310 ends the operation in the flowchart of FIG. 5.

When there is an invalid region, in step S5, the system control unit 310 controls the data processing unit 32 to calculate the position and posture information indicating the position and posture of the measurement information acquisition unit 20 for capturing an image in which saturation or a decrease in contrast does not occur in the previously detected invalid region.

In step S6, the system control unit 310 controls the moving mechanism to move the measurement information acquisition unit 20, to adjust the position and posture thereof, based on the calculated position and posture information. As a result, the process returns to step S1. In step S1, the measurement information acquisition unit 20 in the adjusted posture and position captures an image of the object 15, thereby acquiring an image for generating supplementary data. In step S4, the system control unit 310 extracts the image data corresponding to the invalid region from the image data of the captured image for generating the supplementary data, and generates the supplementary data. Then, the system control unit 310 supplements the invalid region of the previously captured image with the supplementary data to generate new shape measurement data.

The system control unit 310 repeats processes of steps S1 to S6 until the invalid region is no longer detected in step S3, the size of the invalid region decreases to or smaller than a threshold, or the invalid region is no longer detected in a main area such as a central area of the captured image. Thus, the shape measurement data of the object 15 is acquired from a captured image free of saturation or a decrease in contrast. Therefore, the three-dimensional measuring apparatus 1 can generate accurate distance information based on the shape measurement data and improve the distance measurement accuracy.

In the measurement in step S1 performed after moving the measurement information acquisition unit 20 in step S6, the system control unit 310 may change the image capture timing or the exposure amount of the camera 21, or change parameters of the light source drive and detection unit 312 or parameters of the scanner drive and detection unit 313, from the previous measurement.

A modification of supplementation is described below.

In the data supplementation in step S4, the entire data calculated for data supplementation is not necessarily used. Alternatively, the measurement data of only the invalid region determined in step S3 may be used. The data used in step S4 may be a part of the measurement data or the entire measurement data.

Further, as a data supplementation method, the supplementary data as is may be superimposed on the data acquired by the previous measurement. Alternatively, downsampling may be partially performed after the superimposition. Specifically, for example, in the case where the entire supplementary measurement data is used in the supplementation, downsampling may be performed only in the region determined to be a valid measurement region in step S3.

Alternatively, the system control unit 310 may generate only supplementary data corresponding to the invalid region and perform the data supplementation. In this case, as illustrated in the flowchart in FIG. 6, in step S11, the system control unit 310 determines whether or not the current measurement is for generating supplementary data, before performing the measurement in step S12 or step S13.

Figure 6:
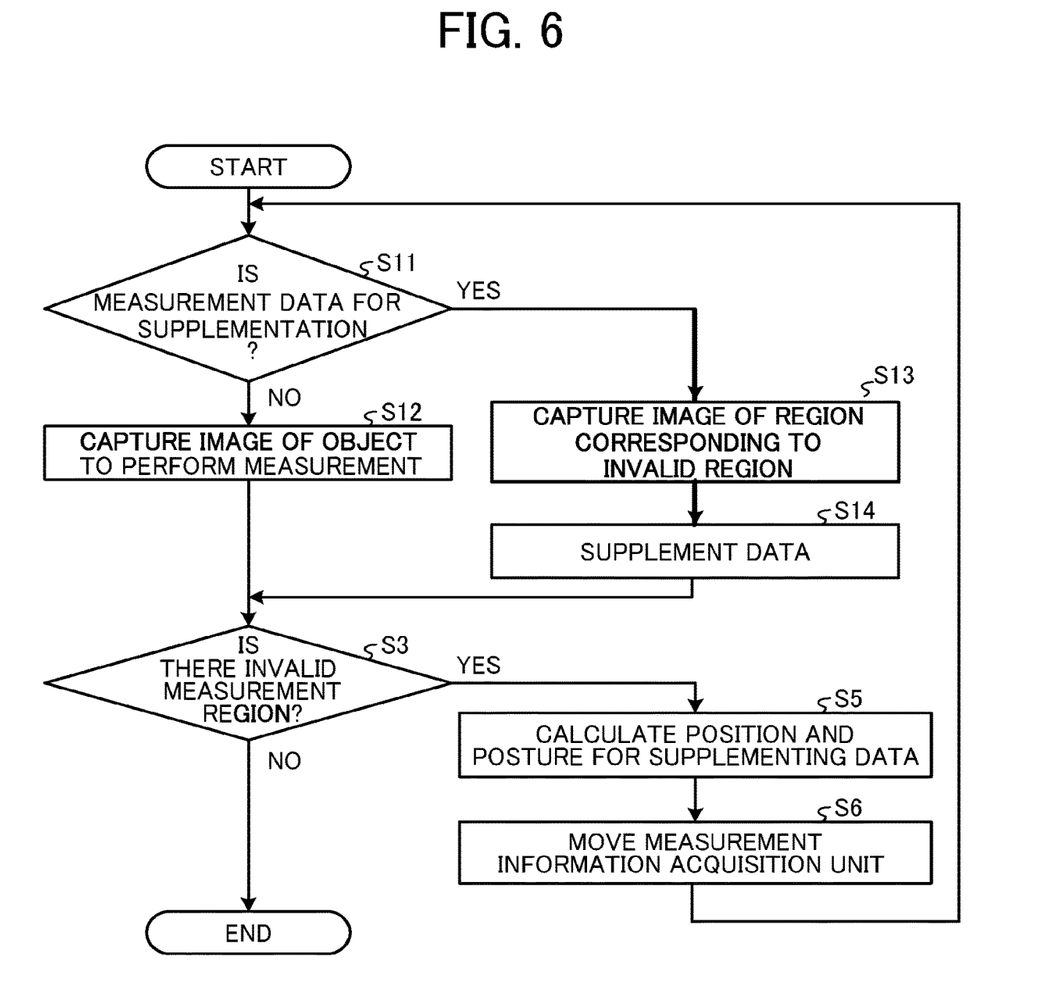
FIG. 6 is a flowchart illustrating another example of supplementation processing of the invalid region.

When the current measurement is for generating supplementary data (step S11: Yes), the system control unit 310 proceeds to step S13 and controls the measurement information acquisition unit 20 so as to capture an image of only the region corresponding to the invalid region. In step S14, the system control unit 310 generates supplementary data based on the captured image of the region corresponding to the invalid region, supplements the invalid region of the previously captured image with the supplementary data, and generates new shape measurement data.

On the other hand, when the current measurement is, for example, initial measurement, not for generating supplementary data, the system control unit 310 controls the measurement information acquisition unit 20 to capture an image of the object 15 in step S12. In step S3, the system control unit 310 detects an invalid region in the captured image, if any. Then, the system control unit 310 adjusts the position and posture of the measurement information acquisition unit 20 to avoid capture of an image including the invalid region (steps S5 and step S6). In step 13, in the next measurement, the measurement information acquisition unit 20 captures an image of only the area corresponding to the invalid region. Then, the supplementary data is generated only in the area corresponding to the invalid region, and the invalid region is supplemented with the supplementary data in step S14.

In the modified example, measurement of only the area used for supplementing the invalid region is performed. Accordingly, the measurement can be performed faster than the case where the entire object 15 is measured, and the total processing time can be reduced.

Determination of Invalid Region

A description is given in detail of determination of the invalid region in step S3 of the flowcharts in FIGS. 5 and 6. The above-mentioned invalid region includes a pixel region in which the brightness value is saturated, a region in which the contrast is low, a region in which the projected pattern is blocked by the object due to the shape of the object 15 and appears as a shadow on the captured image (so-called occlusion region). However, examples of the above-mentioned invalid region are not limited to the above-mentioned three examples.

For measuring the shape of the object 15, a plurality of measurement patterns is projected, and image capture is performed for each of the measurement patterns, to acquire an image. Then, the invalid region is extracted using the captured images of the number of times of image capture. For example, regarding saturation, each pixel region in which brightness value is saturated (brightness value is equal to or greater than a first threshold) is extracted, from each of the acquired images, as the invalid region where the brightness value is saturated. Further, regarding contrast, a pixel region having an amplitude value smaller than a threshold is extracted as an invalid region in which the contrast is low (equal to or smaller than a second threshold). The amplitude value is acquired at the same time as a phase is acquired for each pixel in the case of phase shift measurement.

Further, regarding occlusion that appears as a shadow, in an image captured in a state where the entire projection region is irradiated with pattern projection light, a region having a brightness lower than a threshold is extracted as an invalid region of occlusion.

When the measurement result includes the invalid region extracted in this way, the system control unit 310 determines that there is an invalid region. Alternatively, a new index, such as whether or not the area of the extracted region is equal to or larger than a threshold, may be set, and the system control unit 310 may determine whether or not the extracted region is an invalid region based on the index. A measurement result can include different types of regions, such as brightness saturation regions, low contrast regions, and occlusion regions, and only one type of regions may be extracted as invalid regions. Further, in a case where an invalid region remains in the data generated by repeating the process of step S4 for a preset number of times, the system control unit 310 may determine that there is no invalid region that can be supplemented and end the operation in FIG. 5 or FIG. 6.

Calculation of Position and Posture Information

A description is given in detail of calculation process of the position and posture information in step S5 of the flowcharts in FIGS. 5 and 6. As described above, the invalid regions are classified by type, for example, as a brightness saturation region, a low contrast region, or an occlusion region. The causes of the invalid regions are different, but in each case, it is necessary to estimate: (1) the direction normal to the surface of the object 15 in the invalid region; (2) the incident angle of the measurement pattern light from the projector 10 irradiating the invalid region; and (3) the angle of at which the reflection light of the measurement pattern light reflected from the object 15 travels to the camera 21.

Assume that the object 15 is a known object, the valid measurement region includes the feature points, and the object 15 is sufficiently recognized. In this case, approximate position and posture information of the projector 10 and that of the camera 21 with respect to the object 15 are known, and the shape of the object 15 corresponding to the invalid region is estimated from the shape model. Therefore, the normal direction to the surface of the object 15 can be estimated for each pixel in the invalid region. Further, approximate position and posture information of the projector 10 and that of the camera 21 with respect to the object 15 are known, and the position of the object 15 in the invalid region is also roughly known. Therefore, from calibration information of the projector 10 and the camera 21, the incident angle of the measurement pattern light projected for each pixel in the invalid region and the angle of the reflected light from that region to the camera 21 can be estimated.

There may be a case where recognition of the object 15 is difficult since the object 15 is unknown, or the object 15 is a known but feature points are not included. In such cases, the system control unit 310 extracts an area including a valid measurement region around the invalid region, divides the area into small regions, and generates a predetermined number of small regions including a valid measurement region and an invalid measurement region. Then, a plane is estimated in the small area, and the normal direction to the surface in the invalid region is estimated.

In addition, from the information of the valid measurement region in the small region, the system control unit 310 estimates the incident angle of the pattern light projected in the invalid region of the small region. For example, when the projection pattern is a stripe pattern, the direction of changes in stripes (e.g., the direction perpendicular to the stripes) can be estimated. Then, the amount of change in the projection angle in that direction can be estimated from the pattern projected around the invalid region. Therefore, the incident angle of the measurement pattern light in the invalid region can be estimated from the incident angle of the measurement pattern light projected around the invalid region. Further, since the direction heading to the invalid region can be estimated from each pixel in the invalid region, the angle of the reflected light to the camera 21 can also be estimated from such information.

In this way, using each estimated information, the system control unit 310 determines the position and the posture to which the measurement information acquisition unit 20 is moved for data supplementation, for each type (brightness saturation, low contrast, or occlusion) of the invalid regions.

Figure 7:
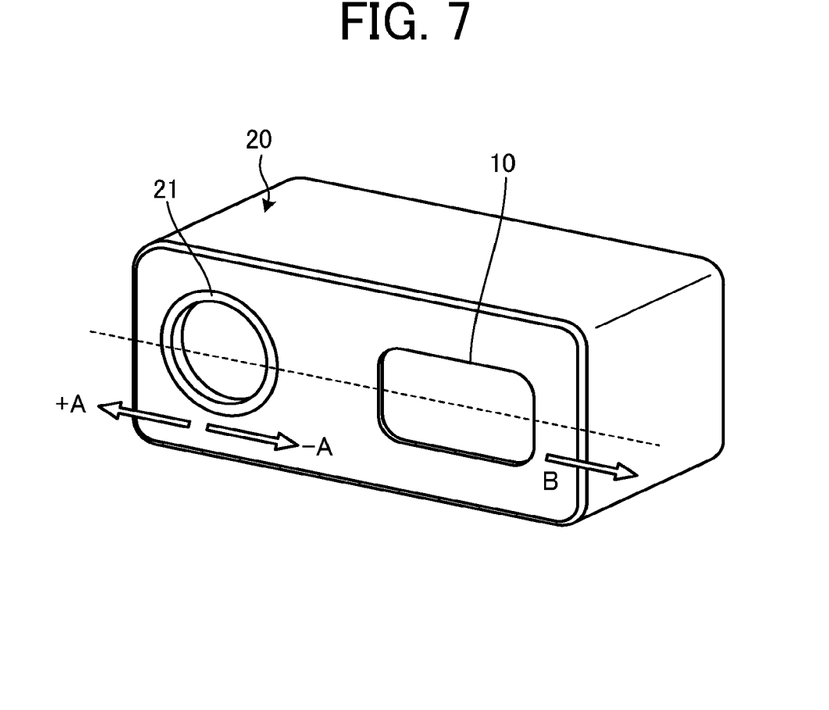
FIG. 7 is a perspective view illustrating an example of a measurement information acquisition unit of the three-dimensional measuring apparatus illustrated in FIG. 1.

Position Adjustment of Measurement Information Acquisition Unit Depending on Invalid Region Type A description is given below of position adjustment of the measurement information acquisition unit 20 per invalid region type. In the brightness saturation region, since the light is incident on the invalid region at an angle close to specular reflection, it is necessary to measure the region at an angle from the axis that becomes specular reflection in the next measurement. The one or both of position and posture of the measurement information acquisition unit 20 are changed so that the pattern light incident angle from the projector 10 that illuminates the invalid region and the angle of the reflected light from that region to the camera 21 are changed by necessary amounts with respect to the normal direction to the surface of the object 15 in the previously estimated invalid region.

A description is given of an example of position adjustment of the measurement information acquisition unit 20 in which the projector 10 is disposed on the −A side of the camera 21 as illustrated in FIG. 7. When specular reflection occurs, the brightness saturation is more likely to occur in a −A side portion than in a +A side portion of the image capture region, that is, the measurement region illustrated in FIG. 7. This is because the −A side portion of the image capture region (measurement region) is closer to the projector 10 than the +A side portion, and the object is more likely to be brightly irradiated with light. Therefore, when the brightness saturation occurs in a −A side portion of the measurement region, the controller 30 moves the measurement information acquisition unit 20 to the −A side so that the object 15 to be measured is farther from the measurement information acquisition unit 20 in the +A direction. As a result, the region that has been regarded as the invalid region can be measured in the next measurement.

Specifically, the controller 30 controls the moving mechanism to move the measurement information acquisition unit 20 by about half the horizontal length of the measurement region. As a result, in the next measurement, the measured object originally located on the −A side of the measurement region can be positioned on the +A side of the measurement region, and the region previously regarded as being invalid can be measured in the next measurement.

A description is given below of another example of position adjustment. For example, when the object 15 is a known object, a predetermined point is set in advance on the known object. The controller 30 rotates, with the moving mechanism, the measurement information acquisition unit 20 by a predetermined amount in a predetermined direction such that the predetermined point always faces the front side while maintaining a certain distance from an origin of the measurement information acquisition unit 20 (a predetermined point set in the measurement information acquisition unit 20). With the rotation of the measurement information acquisition unit 20, the measured object originally located on the −A side of the measurement region can be positioned on the +A side of the measurement region in the next measurement. Then, the region previously regarded as being invalid can be measured.

In contrast to the brightness saturation region, in a low contrast region, the incident amount of light is small. Accordingly, it is necessary to measure the region at an angle close to the axis of specular reflection in the next measurement. In this case as well, the controller 30 changes one or both of the position and posture of the measurement information acquisition unit 20 so that the pattern light incident angle from the projector 10 that illuminates the invalid region and the angle of the reflected light from that region to the camera 21 are changed by necessary amounts with respect to the normal direction to the surface of the object 15 in the previously estimated invalid region.

An example of position adjustment in this case is described. In the case of the measurement information acquisition unit 20 illustrated in FIG. 7, the projector 10 is disposed on the −A side of the camera 21. Therefore, of the entire image capture area (measurement region) of the camera 21, the +A side of the image capture area is farther from the projector 10 and less likely to be irradiated with light. Accordingly, contrast is likely to decrease on the +A side of the image capture area. For this reason, when the low contrast region is generated on the +A side of the measurement region, the controller 30 moves the measurement information acquisition unit 20 to the +A side.

Specifically, the controller 30 moves the measurement information acquisition unit 20 by about half the horizontal length of the measurement region. As a result, the measured object 15 originally located on the +A side of the measurement region can be positioned on the −A side of the measurement region in the next measurement. Then, the three-dimensional measuring apparatus 1 can measure the region that has been the invalid region.

A description is given below of yet another example of position adjustment. For example, when the object 15 is a known object, a predetermined point is set in advance on the known object. The controller 30 rotates, with the moving mechanism, the measurement information acquisition unit 20 by a predetermined amount in a predetermined direction such that the predetermined point always faces the front side while maintaining a certain distance from an origin of the measurement information acquisition unit 20 (a predetermined point set in the measurement information acquisition unit 20), after which measurement is performed.

When the reflection model of the object 15 is known, the controller 30 uses the reflection model information for calculating the position and posture of the measurement information acquisition unit 20 in the next measurement. As a result, the controller 30 can calculate a more suitable position and posture of the measurement information acquisition unit 20.

By contrast, when the object 15 is an unknown object, the controller 30 calculates a center point in the shape data in the valid measurement region of the object 15, rotates the measurement information acquisition unit 20 relative to that point similar to the case of the known object, and then performs measurement.

In the occlusion region, the pattern light projected from the projector 10 onto that region is blocked by the shape of the object 15. Accordingly, the controller 30 can estimate the direction in which the measurement information acquisition unit 20 is to be rotated to perform the next measurement for supplementing the occlusion region from the estimated normal direction to the surface of the object 15 in the invalid region and the angle of incident of the pattern light projected from the projector 10 to the invalid region.

An example of position adjustment in this case is described. As illustrated in FIG. 7, in the case of the measurement information acquisition unit 20 in which the projector 10 is disposed on the −A side of the camera 21, the light reaches the object 15 from the −A side. Therefore, when the object 15 has a recess or a projecting portion, the recess or the projecting portion is likely to block the light, causing an occlusion region on the +A side of the recess or the projecting portion. In this case, by rotating the measurement information acquisition unit 20 by a predetermined angle or moving the measurement information acquisition unit 20 to the +A side in FIG. 7, in the next measurement, the three-dimensional measuring apparatus 1 can measure the region that has been the invalid region.

As one example, the predetermined angle is preferably 90 degrees to 270 degrees, and more preferably 90 degrees to 270 degrees excluding 180 degrees. Such a range of the predetermined angle is advantageous in a case where the measurement information acquisition unit 20 projects only a unidirectional stripe pattern as the above-mentioned measurement pattern. That is, even when an edge of the object 15 is present in the same direction as the direction of the stripe pattern, such a range of the predetermined angle can prevent decreases in measurement accuracy.

Further, as another example of position adjustment, similar to the above-described position adjustment for the brightness saturation region and the low contrast region, the controller 30 may determine the predetermined point and rotate the measurement information acquisition unit 20 with respect to the predetermined point.

When there are a plurality of invalid regions such as the brightness saturation region, the low contrast region, and the occlusion region, the controller 30 moves the measurement information acquisition unit 20 so as to supplement the invalid regions, according to a priority determined by the position of the measurement region of the object 15 or the type of the invalid region. As a result, in the next measurement, the three-dimensional measuring apparatus 1 can measure the invalid region having a high priority among the regions that has been the invalid region.

Further, as described above, in a case where the measurement information acquisition unit 20 projects only a unidirectional stripe pattern as the above-mentioned measurement pattern, the measurement accuracy deteriorates when an edge of the object 15 is present in the same direction as the direction of the stripe pattern. Therefore, the controller 30 rotates the measurement information acquisition unit 20 by a predetermined angle, and then performs the measurement for acquiring the supplementary data. The predetermined angle is such an angle that the edge of the object 15 and the direction of the stripe pattern do not overlap, and, preferably, the edge of the object 15 is different from the direction of the stripe pattern by at least 3 degrees. A more preferable example of the angle difference is about 90 degrees. With such a predetermined angle, even when an edge of the object 15 is present in the same direction as the direction of the stripe pattern, the measurement accuracy does not deteriorate.

As described above, according to the first embodiment, the three-dimensional measuring apparatus 1 is configured to: recognize, as an invalid area, a region having saturation or a low contrast in an image captured for distance measurement; estimate, from a measurement result of a valid measurement region around the invalid region, a portion of the object 15 corresponding to the invalid region, the projection angle of the measurement pattern, and the angle of incidence of the reflected light on the camera 21; and calculate, based on the estimated measurement result, relative position (position and posture) between the measurement information acquisition unit 20 and the object 15 with which saturation or a decrease in contrast is not caused in the invalid region.

Then, the three-dimensional measuring apparatus 1 controls the position and posture of the measurement information acquisition unit 20, performs image capturing, to acquire a captured image without saturation or a decrease in contrast, and supplements the invalid region of the previously captured image with the subsequently captured image. As a result, the three-dimensional shape of the object 15 can be measured accurately and reliably. In addition, it is not necessary to repeat remeasurement many times, and the supplemented measurement data without a defect can be acquired in a relatively short time.

In the above-described first embodiment, the position and the posture of the measurement information acquisition unit 20 are adjusted so that supplementary data can be generated. Alternatively, the controller 30 can change:

1) the position (and the posture) of the object 15 to be irradiated with the measurement pattern light;
2) the position (and the posture) of the projector 10;
3) the position (and the posture) of the camera 21; or
4) the relative positions between the projector 10 and the camera 21.

Specifically, the three-dimensional measuring apparatus 1 includes a moving mechanism for changing at least one of 1) to 4), and the system control unit 310 controls the moving mechanism to change the position (and posture, or position or posture) or relative positions, to provide the same effect as that provided by the first embodiment.

A second embodiment is described below.

Figure 8:
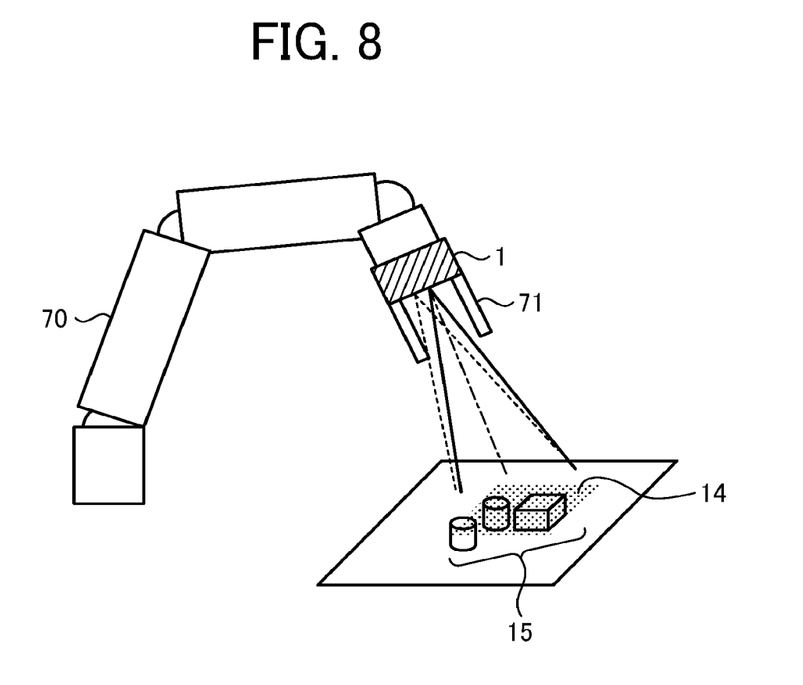
FIG. 8 is a view illustrating an articulated robot arm according to a second embodiment.

The second embodiment is an example of a robot including the three-dimensional measuring apparatus 1 according to the first embodiment described above. FIG. 8 is a view illustrating an articulated robot arm 70 of the robot according to the second embodiment. In FIG. 8, the robot arm 70 includes a robot hand 71 to pick up the object 15, and the three-dimensional measuring apparatus 1 according to the first embodiment is disposed in the immediate vicinity of the robot hand 71. The robot arm 70 includes a plurality of bendable movable portions (an example of the moving mechanism) and changes the position and the posture of the robot hand 71 under control of the controller 30. For example, the controller 30 of the three-dimensional measuring apparatus 1 inputs a control signal to a controller of the robot arm 70 to drive a drive unit of the robot arm 70. Alternatively, the control signal of the controller 30 of the three-dimensional measuring apparatus 1 may be input to the controller of the robot arm 70 via another signal processing unit such as a PC.

The three-dimensional measuring apparatus 1 is disposed so that the projection direction of the light coincides with the orientation of the robot hand 71. The three-dimensional measuring apparatus 1 measures the object 15 to be picked by the robot hand 71.

The robot according to the second embodiment can measure, from a short distance, the object 15 to be picked by the three-dimensional measuring apparatus 1 disposed at the robot arm 70. Therefore, the measurement accuracy can be improved as compared with the case where the object 15 to be picked is measured from a far distance by a camera or the like. Further, although, in the case of measuring from a far distance with a camera, etc., the robot arm 70 may invade the measurement range of the camera, hindering the image capture, such an inconvenience does not occur, and real-time feedback is easy.

Further, when the three-dimensional measuring apparatus 1 is disposed so that the measurement range of the three-dimensional measuring apparatus 1 does not overlap with the robot hand 71, advantageously, the measurement range is not narrowed because the measurement range is not overlapped with the robot hand 71.

For example, in the field of factory automation (FA) in various assembly lines of factories, robots, such as the robot arm 70, are used for inspection and recognition of parts. A robot provided with the three-dimensional measuring apparatus 1 can accurately inspect and recognize parts.

In addition, the three-dimensional measuring apparatus 1 may be disposed at a tip of the robot arm 70. In this case, the robot arm 70 can be inserted inside a narrow object 15, such as a pot, in which a body diameter is larger than a mouth diameter, and can measure the internal space of the object 15. That is, even when the object 15 has a limited work area, measurement can be performed within the movable range of the robot arm 70.

The face of the robot arm 70 to which the three-dimensional measuring apparatus 1 is attached is aligned in parallel with the face of the three-dimensional measuring apparatus 1 including the longitudinal direction. As a result, the length of the tip of the robot arm 70 in each axial direction can be shortened. Therefore, size of the entire three-dimensional measuring apparatus 1 can be reduced, and the interference with the surrounding environment can be reduced.

Further, when an invalid region exists in the captured image for distance measurement, the three-dimensional measuring apparatus 1 sends feedback to the robot arm 70, that is, provides the robot arm 70 with position and posture information indicating the position and the posture for acquiring supplementary data in the next measurement, based on the image signal and the three-dimensional shape information. As a result, the robot arm 70 can be easily controlled, and parts can be inspected or recognized more accurately based on the measurement result acquired on the supplementary data.

Further, the position and the posture of the three-dimensional measuring apparatus 1 may be changed relative to the measured object. Therefore, although the three-dimensional measuring apparatus 1 is disposed at the robot arm 70 in the example illustrated in FIG. 8, alternatively, the measured object may be disposed on the robot arm 70 and the relative positions therebetween and the posture of the robot arm 70 may be changed.

Specifically, when the measured object is disposed on the robot arm 70, the relative positions (position and posture) between the three-dimensional measuring apparatus 1 and the measured object can be changed to the above-described relationship as the position adjustment of the measurement information acquisition unit 20 for each invalid region type.

That is, when brightness saturation occurs in a −A side portion of the measurement region, the three-dimensional measuring apparatus 1 moves the robot arm 70 in the +A direction illustrated in FIG. 7. At this time, by moving the robot arm 70 by half the horizontal length of the measurement region, the object 15 originally located on the −A side of the measurement region can be moved to the +A side of the measurement region. As a result, the region that has been the invalid region can be measured in the next measurement.

Further, when contrast decreases in a +A side portion of the measurement region, the three-dimensional measuring apparatus 1 moves the robot arm 70 in the direction indicated by arrow B (hereinafter "direction B") in FIG. 7. At this time, the robot arm 70 is moved by half the length of the horizontal length of the measurement region. For example, when the horizontal length of the measurement region is 100 mm, the robot arm 70 is moved by 50 mm in the direction B in FIG. 7. As a result, the object 15 originally located on the +A side of the measurement region can be moved to the −A side of the measurement region, and the three-dimensional measuring apparatus 1 can measure the region that has been the invalid region in the next measurement.

In the case of occlusion, the robot arm 70 is rotated by, for example, 180 degrees, or moved in the direction B in FIG. 7. As a result, the region that has been the invalid region can be measured in the next measurement.

Next, a description is given of a third embodiment.

This third embodiment is an example in which the three-dimensional measuring apparatus 1 according to the first embodiment is provided in an electronic device such as a smartphone or a personal computer.

Figure 9:
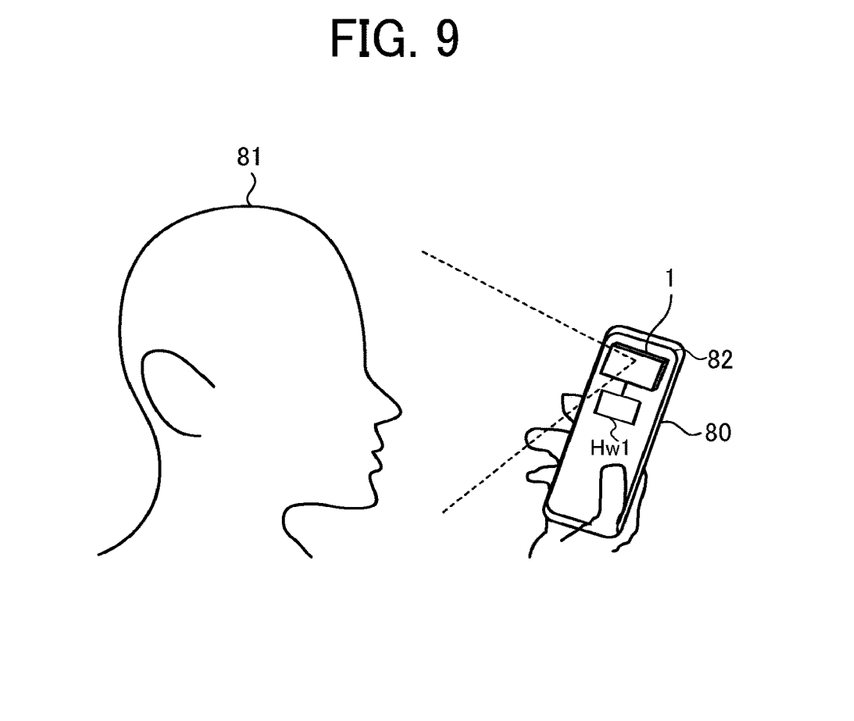
FIG. 9 is a view illustrating a smartphone according to a third embodiment.

FIG. 9 is a diagram illustrating a smartphone 80 including the three-dimensional measuring apparatus 1. The smartphone 80 includes the three-dimensional measuring apparatus 1 and has a user authentication function. The user authentication function is implemented by, for example, dedicated hardware Hw1 (an authentication device). In addition to the dedicated hardware Hw1, the authentication function may be implemented by the CPU of the smartphone executing a program stored, for example, in the read only memory (ROM).

The measuring apparatus 1 measures the shape of the face, ears, or the head of a user 81. Based on the measurement result, the authentication function unit determines whether or not the user 81 is a legitimate user registered in the smartphone 80.

According to the third embodiment, the three-dimensional measuring apparatus 1 in the smartphone 80 can measure the shape of the face, the ears, or the head of the user 81 with high accuracy, thereby improving the user recognition accuracy. In the third embodiment, the three-dimensional measuring apparatus 1 is provided in the smartphone 80, but may be provided in another electronic apparatus such as a personal computer or a printer. Further, the three-dimensional measuring apparatus 1 may be used for a function other than the personal authentication function.

When an invalid region exists, the control unit 31 of the three-dimensional measuring apparatus 1 generates the position and posture information indicating the position and the posture of the smartphone 80 for acquiring supplementary data in the next measurement, based on the image signal and the three-dimensional shape. Then, the control unit 31 displays the position and posture information on a display 82 of the smartphone 80. As a result, the user 81 can adjust the position and posture of the smartphone 80, and the smartphone 80 can perform more accurate authentication based on the supplemented measurement result.

Next, a description is given of a fourth embodiment.

Figure 10:
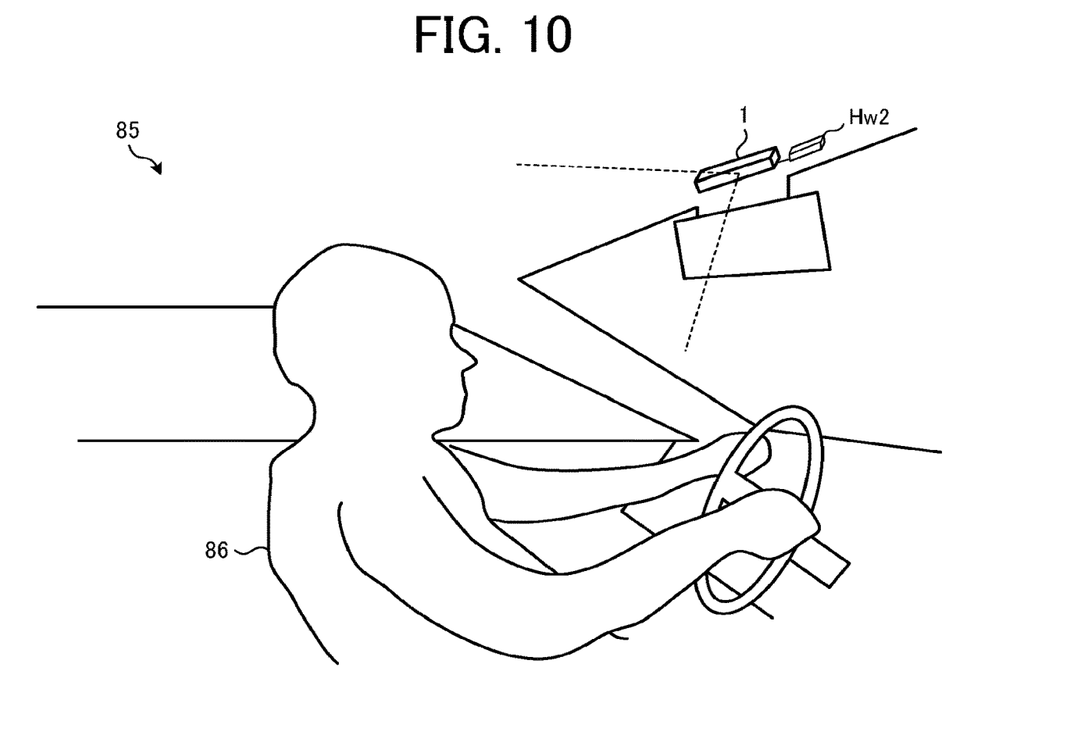
FIG. 10 is a view illustrating a movable apparatus according to a fourth embodiment.

The fourth embodiment is an example in which the three-dimensional measuring apparatus 1 according to the first embodiment is provided on a vehicle. FIG. 10 illustrates an example in which the three-dimensional measuring apparatus 1 is provided in a motor vehicle as an example of a movable apparatus. In FIG. 10, a motor vehicle 85 includes the three-dimensional measuring apparatus 1 and a drive assist system inside the motor vehicle 85. The drive assist system is implemented by, for example, dedicated hardware Hw2 (a drive assist device).

The "drive assist system" may be implemented by hardware other than the dedicated hardware Hw2, or the CPU of the computer executing a program stored, for example, in the ROM. The three-dimensional measuring apparatus 1 measures the face, the posture, and the like of a driver 86. Based on the measurement result, the drive assist system provides appropriate drive assistance in accordance with the situation of the driver 86.

Providing the above-mentioned three-dimensional measuring apparatus 1 in the motor vehicle 85 is advantageous in that the face and the posture of the driver 86 can be measured with high accuracy, and the state recognition accuracy of the driver 86 in the motor vehicle 85 can be improved.

In the fourth embodiment, the three-dimensional measuring apparatus 1 is provided in the motor vehicle, but may be provided in a train or on a driver seat (or passenger seat) of an airplane. In addition to recognizing the state of the driver 86 such as the face and posture, the three-dimensional measuring apparatus 1 may be used for recognizing the state of the passenger or the inside of the motor vehicle 85. Further, the three-dimensional measuring apparatus 1 may be used, for the security of a motor vehicle, for authenticating the driver 86 personally and determining whether or not the driver is registered in advance as a legitimate driver of that motor vehicle.

A fifth embodiment is described below.

Figure 11:
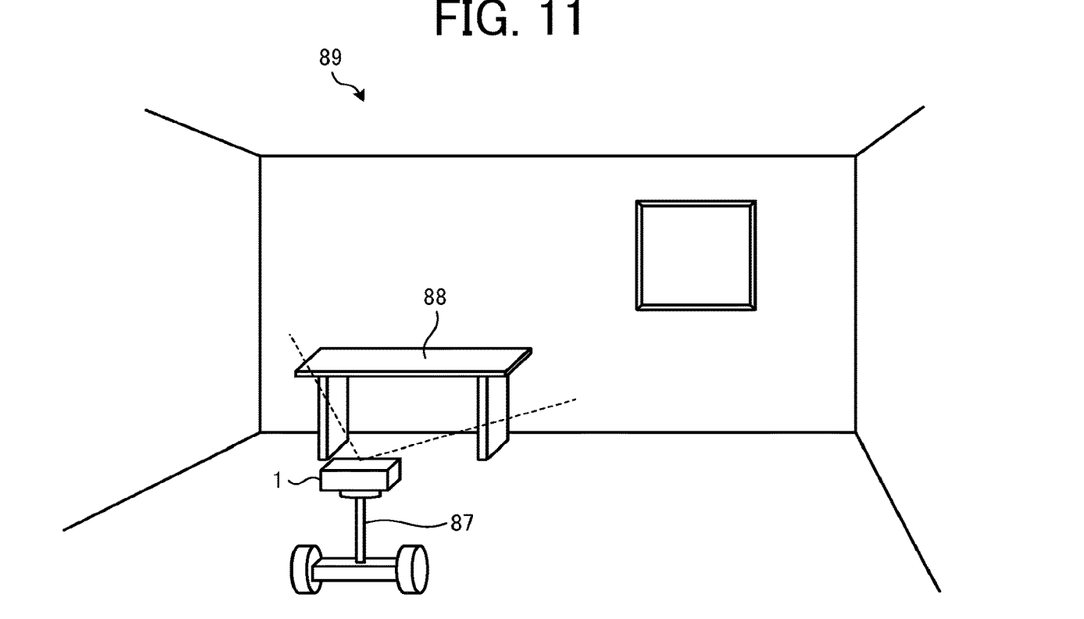
FIG. 11 is a view illustrating a robot according to a fifth embodiment.

FIG. 11 is a diagram illustrating another example of the movable including the three-dimensional measuring apparatus 1. FIG. 11 illustrates an autonomous traveling robot 87 that is an example of the movable apparatus according to the fifth embodiment. The autonomous traveling robot 87 includes the three-dimensional measuring apparatus 1 according to the first embodiment. The three-dimensional measuring apparatus 1 measures the distances to objects around the autonomous traveling robot 87, respectively. Based on the measurement result, the autonomous traveling robot 87 recognizes the layout of a room 89, such as the position of a desk 88, and calculates the travel route thereof.

As described above, according to the fifth embodiment, providing the three-dimensional measuring apparatus 1 on the autonomous traveling robot 87 is advantageous in that the autonomous traveling robot 87 can recognize the position of the objects therearound with high accuracy and calculate the travel route. Thus, the three-dimensional measuring apparatus 1 can assist the operation of the autonomous traveling robot 87. In this example, the three-dimensional measuring apparatus 1 is provided on the autonomous traveling robot 87 that is relatively small, but the three-dimensional measuring apparatus 1 may be provided on a motor vehicle or the like. Further, the three-dimensional measuring apparatus 1 may be used not only indoors but also outdoors for measuring a building or the like.

Further, when an invalid region exists in the captured image, the three-dimensional measuring apparatus 1 sends feedback to the autonomous traveling robot 87, that is, provides the autonomous traveling robot 87 with position and posture information indicating the position and the posture for acquiring supplementary data in the next measurement, based on the image signal and the three-dimensional shape information. This configuration can facilitate control of the autonomous traveling robot 87, and the autonomous traveling robot 87 can determinate the travel route more accurately and calculate the layout more accurately from the supplemented measurement results.

Next, a sixth embodiment is described.

Figure 12:
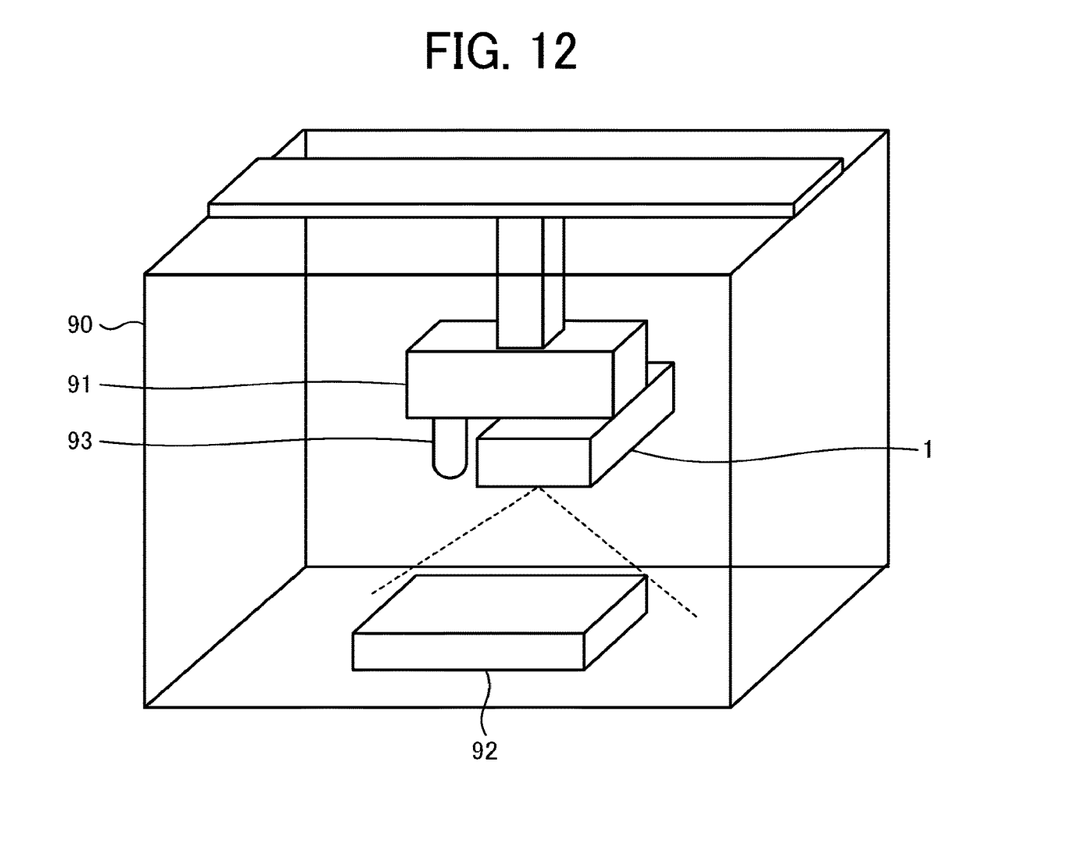
FIG. 12 is a view illustrating a three-dimensional (3D) printer according to a sixth embodiment.

The sixth embodiment is an example in which the above-mentioned three-dimensional measuring apparatus 1 is provided in a three-dimensional measuring apparatus (3D) printer which is an example of a fabricating apparatus. FIG. 12 is a perspective view of a 3D printer 90. As illustrated in FIG. 12, the three-dimensional measuring apparatus 1 is provided on a printer head 91 of the 3D printer 90. The printer head 91 includes a nozzle 93 for discharging a fabrication liquid for fabricating a product 92. The three-dimensional measuring apparatus 1 measures the shape of the product 92 being fabricated by the 3D printer 90 during the fabrication. The 3D printer 90 controls the fabrication of the product 92 based on the measurement result.

As described above, the 3D printer 90 according to the sixth embodiment can measure the shape of the product 92 during the fabrication of the product 92 by the three-dimensional measuring apparatus 1, and can fabricate the product 92 with high accuracy.

In this example, the three-dimensional measuring apparatus 1 is provided on the printer head 91 of the 3D printer 90, but may be provided on another portion of the 3D printer 90.

Further, when an invalid region exists in the captured image, the three-dimensional measuring apparatus 1 sends feedback to the 3D printer 90, that is, provides the 3D printer 90 with position and posture information indicating the position and the posture for acquiring supplementary data in the next measurement, based on the image signal and the three-dimensional shape information of the product 92. This configuration can facilitate control of the 3D printer 90 and control the fabrication more accurately based on the supplemented measurement results.

The above-described embodiments are examples and are not intended to limit the scope of the present disclosure. The above-described aspects of the present disclosure can be embodied in other various forms, and various omissions, replacements, and changes can be made without departing from the scope of the invention. It is therefore to be understood that within the scope of the appended claims, the embodiments may be practiced otherwise than as specifically described herein. For example, elements and/or features of different illustrative embodiments may be combined with each other and/or substituted for each other within the scope of the present disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A measuring apparatus comprising:
an irradiator to irradiate an object with light;
an imager to capture an image of the object irradiated with the light and generate captured image data; and
circuitry configured to:
measure the object based on the captured image data generated by the imager;
estimate an incident angle of the light from the irradiator irradiating an invalid region;
calculate position and posture information based on the incident angle that has been estimated; and
adjust, based on the position and the posture information relative positions among the object, the irradiator, and the imager,
wherein the incident angle is estimated with respect to a normal direction to a surface of the object, and
wherein the circuitry is further configured to:
control the imager to capture an image of the object with the relative positions that were adjusted, to generate supplementary image data to be used in the invalid region; and
supplement the invalid region with the supplementary image data.

2. The measuring apparatus according to claim 1, wherein the circuitry is configured to change the relative positions between the object and the irradiator.

3. The measuring apparatus according to claim 1, wherein the circuitry is configured to change the relative positions between the irradiator and the imager.

4. The measuring apparatus according to claim 1, wherein the circuitry is configured to change the relative positions between the imager and the object.

5. The measuring apparatus according to claim 1, wherein the invalid region has at least one of:
a brightness is equal to or greater than a first threshold; and
a contrast is equal to or smaller than a second threshold.

6. The measuring apparatus according to claim 1, wherein the circuitry is configured to control the irradiator to emit light of a given pattern to the object.

7. A robot comprising:
the measuring apparatus according to claim 1; and
an articulated robot arm to which the measuring apparatus is attached.

8. An electronic apparatus comprising:
the measuring apparatus according to claim 1; and
authentication circuitry configured to authenticate a user of the electronic apparatus based on a measurement result of the user generated by the measuring apparatus.

9. A movable apparatus comprising:
the measuring apparatus according to claim 1; and
drive assist circuitry configured to assist driving of a mover to adjust the irradiator based on a measurement result generated by the measuring apparatus.

10. A fabricating apparatus comprising:
the measuring apparatus according to claim 1; and
a head configured to fabricate a product based on a measurement result generated by the measuring apparatus.

11. The measuring apparatus according to claim 1, further comprising:
a moving mechanism to adjust the relative positions.

12. The measuring apparatus according to claim 1, further comprising:
a robot arm to adjust the relative positions.

13. The measuring apparatus according to claim 1, wherein the circuitry is further configured to:
determine that a portion of the captured image data includes a portion that is the invalid region.

14. The measuring apparatus according to claim 1, wherein the circuitry is further configured to calculate the position and the posture information based on:
a direction normal to a surface of the object in the invalid region, and
an angle of at which the light from the irradiator is reflected from the object travels to the imager.

15. A method for measuring an object, the method comprising:
irradiating the object with light from an irradiator;
capturing, with an imager, an image of the object irradiated with the light and generating captured image data;
measuring the object based on the captured image data;
estimating an incident angle of the light from the irradiator irradiating an invalid region;
calculating position and posture information based on the incident angle that has been estimated; and
adjusting, based on the position and the posture information, relative positions among the object, the irradiator, and the imager,
wherein the incident angle is estimated with respect to a normal direction to a surface of the object,
the method further comprising:
controlling the imager to capture an image of the object with the relative positions that were adjusted, to generate supplementary image data to be used in the invalid region; and
supplementing the invalid region with the supplementary image data.

16. The method according to claim 15,
wherein the adjusting includes changing in the relative positions between the object and the irradiator.

17. The method according to claim 15,
wherein the adjusting includes changing the relative positions between the irradiator and the imager.

18. The method according to claim 15,
wherein the adjusting includes changing the relative positions between the imager and the object.

19. The method according to claim 15, wherein the invalid region has at least one of:
a brightness is equal to or greater than a first threshold; and
a contrast is equal to or smaller than a second threshold.

20. The method according to claim 15, wherein:
the irradiating includes emitting light of a given pattern to the object.

21. The method according to claim 15, further comprising:
determining that a portion of the captured image data includes a portion that is the invalid region.

22. The method according to claim 15, wherein:
the calculating the position and the posture information is based on:

a direction normal to a surface of the object in the invalid region, and an angle of at which the light from the irradiator is reflected from the object travels to the imager.

\* \* \* \* \*